Nov. 18, 1969 W. E. LANHAM ET AL 3,478,705
PROOFERS AND OVENS FOR BREAD PRODUCTS
Filed April 3, 1967 4 Sheets-Sheet 1
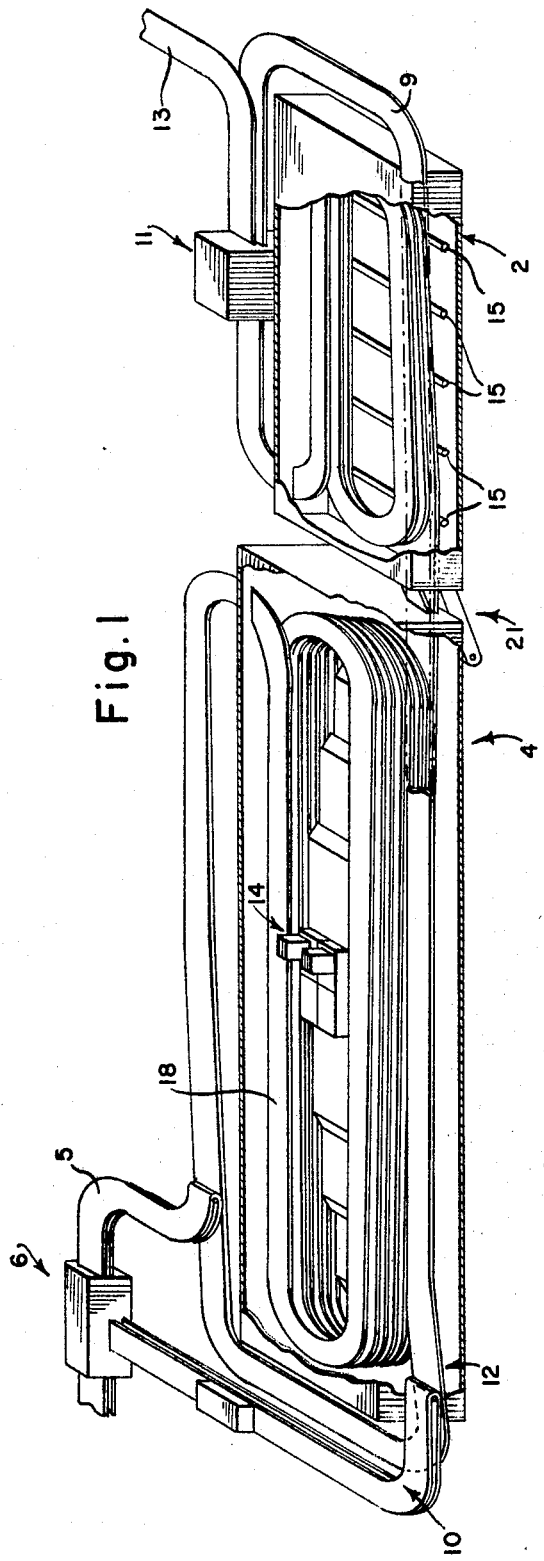
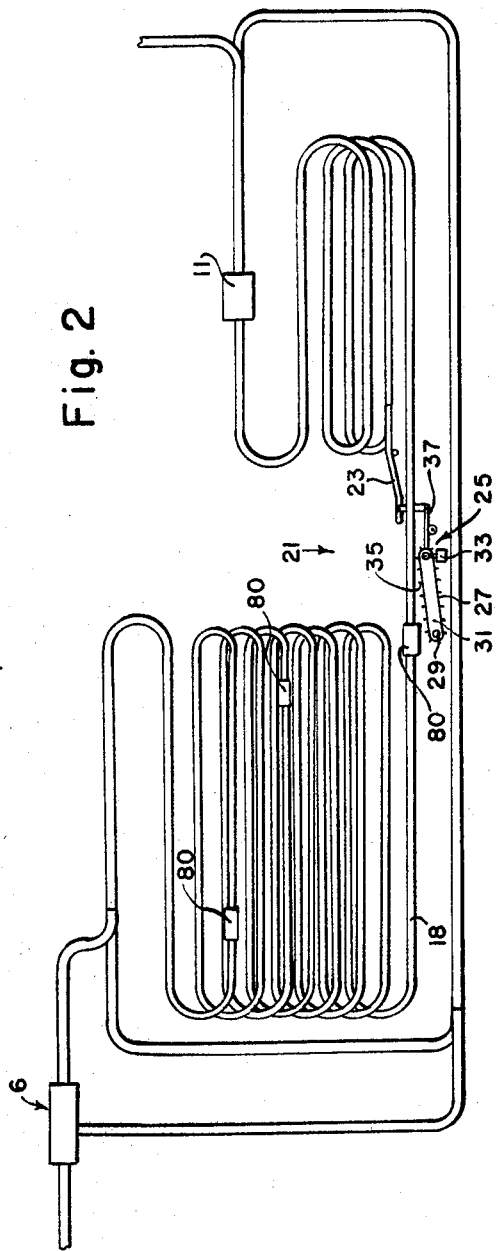
INVENTORS
WILLIAM E. LANHAM
GENE C. MILLER
BY WILLIAM E. LANHAM, Jr.
*Curtis, Morris & Safford*
ATTORNEYS

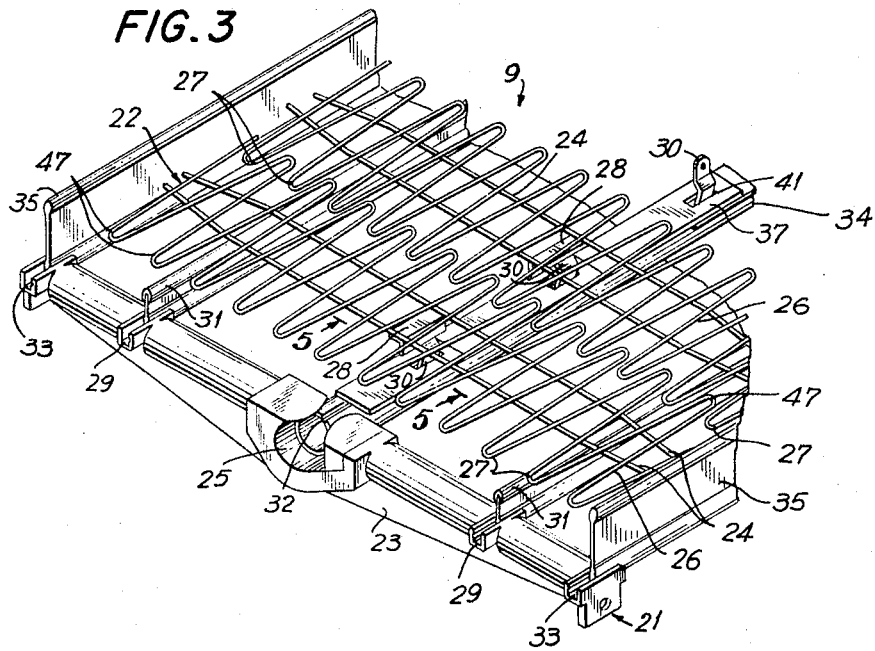
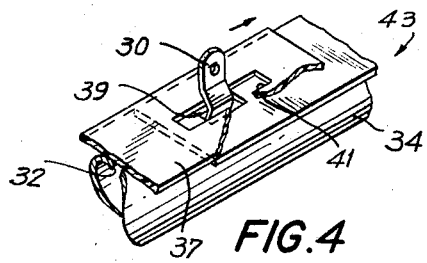
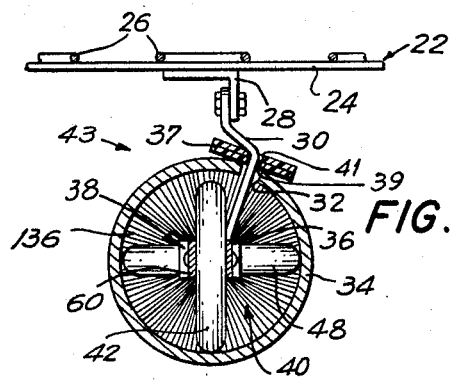

Nov. 18, 1969  W. E. LANHAM ET AL  3,478,705
PROOFERS AND OVENS FOR BREAD PRODUCTS
Filed April 3, 1967  4 Sheets-Sheet 3

INVENTORS
WILLIAM E. LANHAM
GENE C. MILLER
BY  WILLIAM E. LANHAM, Jr.

ATTORNEYS

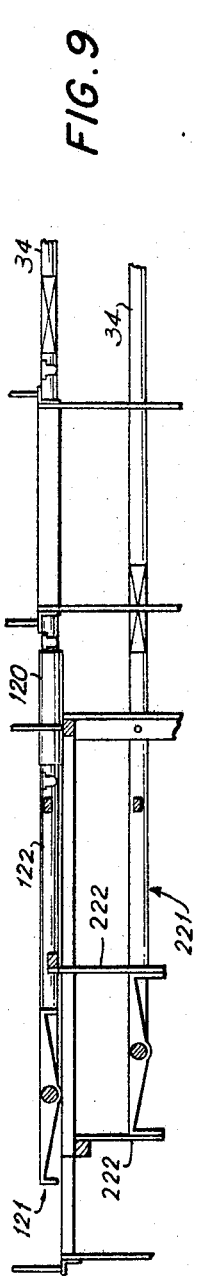
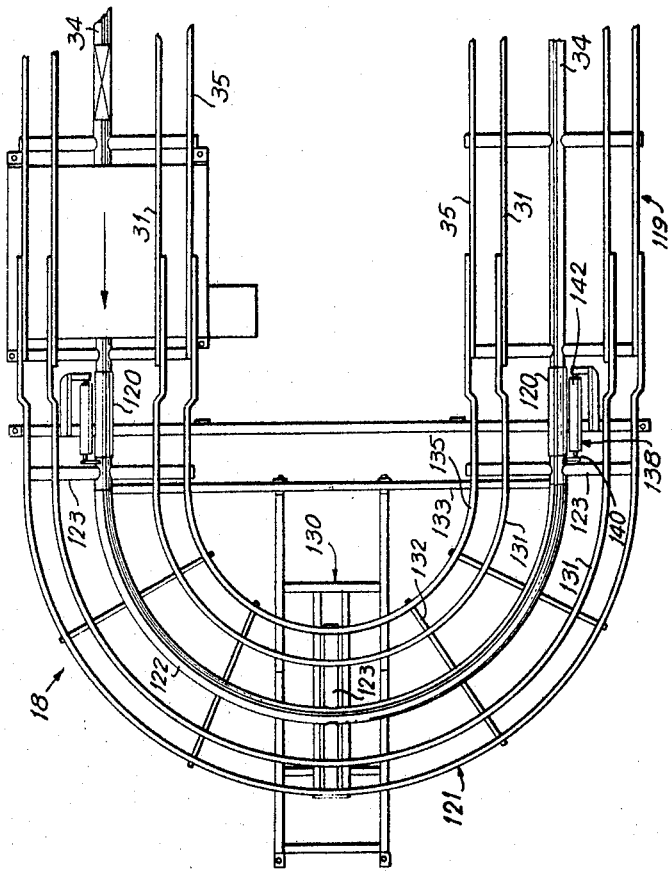

United States Patent Office 3,478,705
Patented Nov. 18, 1969

3,478,705
PROOFERS AND OVENS FOR BREAD PRODUCTS
William E. Lanham, 3456 Woods Drive, Gene C. Miller, 3540 Woods Drive, and William E. Lanham, Jr., 3044 Katherine Valley Road, all of Decatur, Ga. 30032
Continuation-in-part of application Ser. No. 593,504, Nov. 10, 1966. This application Apr. 3, 1967, Ser. No. 627,700
Int. Cl. A21b 3/07
U.S. Cl. 107—57                                        4 Claims

ABSTRACT OF THE DISCLOSURE

A system is disclosed for proofing and baking bread products upon a continuously moving conveyor which carries the product through a proofer unit, and thence through an oven.

---

This appliaction is a continuation-in-part of our co-pending application Ser. No. 593,504, filed Nov. 10, 1966, which was a continuation-in-part of application Ser. No. 448,732, filed Apr. 16, 1965 and issued as Patent No. 3,285,394.

This invention relates to the proofing and baking of bakery products such as bread and rolls. In particular, it relates to continuous conveyor systems for handling baking products during the proofing and baking processes.

An object of this invention is to provide improved means for proofing raw dough, for transferring the proofed dough to baking ovens, and for baking it. A further object of this invention is to provide a single continuous conveyor system that includes both the proofing and baking processes. A further object is to provide a conveyor system of the type referred to above which is efficient, dependable and adaptable to varying conditions of operation and use. A still further object is to provide improved features and refinements in a system of the above character. These and other objects will be in part obvious and in part pointed out below.

In the drawings:

FIGURES 1 and 2 are somewhat schematic representations of one embodiment of the invention;

FIGURE 3 is a perspective view of a portion of the conveyor system of FIGURE 1;

FIGURE 4 is a somewhat schematic side elevation of a portion of the conveyor system of FIGURE 1;

FIGURE 5 is an enlarged sectional view on the line 5—5 of FIGURE 4;

FIGURE 8 is a plan view of the end portion of the spiral conveyor in the proofer shown in FIGURE 1; and, FIGURE 9 is a side elevation taken at the bottom of FIGURE 8 and showing adjacent spirals of the conveyor.

Figure 6:
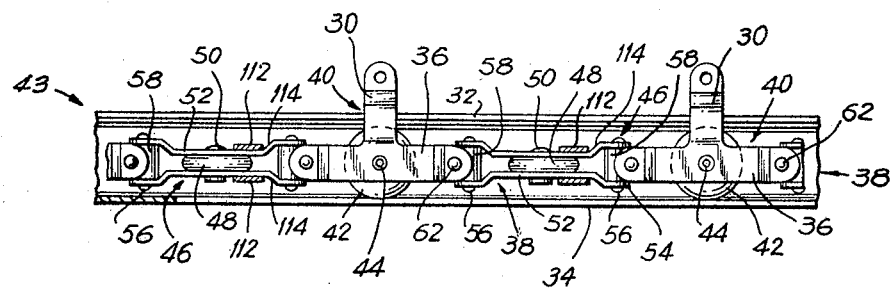
FIGURE 6 is a horizontal plan view of one of the driving units of the system of the embodiment of FIGURE 1 and a related portion of the conveyor track.

Referring to FIGURE 1 of the drawings, the interior of a bakery, which is represented somewhat schematically, contains a proofer 4, an oven 2, an endless loading conveyor 5, and an endless take-off conveyor 10. Feed apparatus 6 fills baking pans with raw dough pieces and places the filled pans on loading conveyor 5, which conveys them to endless conveyor 9, which carries them in the direction of the arrow, through proofer 4 and oven 2. Conveyor 9 moves continuously and at a constant rate. After leaving the oven, the baked goods are conveyed to depanner 11, which removes them from their pans and places them on a separate product conveyor 13. The empty pans are replaced on conveyor 9 which delivers them at 12 to take-off conveyor 10 by which they are carried to the feed apparatus 6.

Proofer 4 and oven 2 have insulated side and top walls which provide closed chambers, except for openings through which the conveyor passes. Also, there are insulated access doors through which personnel may enter and there are exhaust outlets in the top wall of the proofer for exhausting the air so as to maintain the desired ambient conditions. Centrally positioned within the proofer is an air conditioning system 14 which provides uniform circulation of air over the products upon the conveyor system. System 14 also conditions the air and maintains the desired temperature and humidity conditions, and exhausts air at the top. The product moves at a constant rate through the proofer and the oven, starting in the proofer at the top of the spiral and passing along the continuous path around the successive turns of the spiral without being jarred or roughly handled. Also, the products are subjected to uniform conditions, so that each item is processed identically with each other item. The speed of movement of the conveyor is controlled, and its speed is adjusted for each particular type of product, with the speed of movement being such that each product item remains within the proofer and then in the oven for the exact periods of time required for proofing and baking to produce optimum quality.

After the completion of the proofing process, the dough items are conveyed a short distance to the baking oven 2, which has an upward spiral conveyor path and is similar in its structure and mode of operation to the proofer. A series of burners 15, located near the bottom of oven 2, provides the heat for the baking process. The items move through the oven in the ascending spiral, and they leave the oven from approximately the same level as that at which they entered proofer 4.

The system of the illustrative embodiment is arranged to provide optimum proofer and baking conditions for various products, and the speed of conveyor 9 is adjustable to provide the desired proofing and baking times. Hence, when bread of a particular type and loaf-size is being proofed and baked, the speed of the conveyor is adjusted for that particular product. However, there is a specific ratio between the lengths of the conveyor paths through the proofer and through the oven, and there is a corresponding ratio between the proofing and baking times when the products pass through the entire system. However, the invention contemplates that this ratio may be changed by causing the product to bypass a specific portion of the conveyor path. Accordingly, positioned between the proofer and the oven there is a product bypass assembly 21 which is shown somewhat schematically in FIGURE 2.

Assembly 21 comprises an endless transfer conveyor 23 and a take-off unit 25 positioned respectively above and below conveyor 9 at the discharge port from the proofer. Take-off unit 25 has an endless belt 27 which is adapted to be driven at the same speed as belt 9 and is mounted upon a swingable frame 31. Frame 31 is supported at the left by a fixed pivot 29, and the right-hand end may be moved up and down by a cylinder and piston unit 33. Belt 27 carries a plurality of fingers 35 which project through conveyor 9 when the right-hand end of the frame is elevated. The fingers move synchronously with the conveyor, and as they are projected upwardly they lift the forward end of each pan as it moves from the proofer. The left-hand end of conveyor 23 is also movable to and from conveyor 9 and is mechanically connected to frame 31 by a linkage assembly 37. Hence, when belt 27 is moved to its elevated position, the left-hand end of conveyor 3 is moved downwardly toward the top surface of conveyor 9. With that condition, the elevated end of each of the pans moves onto conveyor 23, and the pans move upwardly and enter the oven at an elevated level in the oven spiral of conveyor 9. Hence, rolls or other products which are being proofed and baked which require a lesser ratio of baking time to proofer time, are given a shorter path through the oven than are standard loaves of bread. That is, when rolls are being proofed and baked, the speed of conveyor 9 is adjusted to provide the desired proofing time, and the pans are then diverted to the proper level in the oven to provide the desired baking time.

As shown in FIGURE 2, conveyor 9 is provided with three drive units 80 which will be described more fully below, and which impart uniform driving movement to the conveyor.

Referring now to FIGURE 3, conveyor 9 is formed by a series of product-supporting racks 22, each of which comprises two transverse bars 24 and a bar which is bent in a zig-zag form to provide a number of generally longitudinal bar portions or product-supporting bars 26. Hence, each bar 26 is interconnected to the next bar at its lead end by a U-bend 47, and at its trailing end by a U-bend 27. The U-bends 47 overlap with the U-bends 27 of the next leading rack. Hence, continuous support is provided for products resting upon the bars 26. Also, the individual racks may move separately around bends and turns without restrictions which would be present with a continuous belt-type of conveyor. Each rack is individually supported by a rail assembly 21 and a bracket 28 (see also FIGURE 5), each bracket 28 being supported by a conveyor chain and tube assembly 43. Each bracket 28 is bolted to and supported by a vertical bracket 30 which extends through a slot 32 into a conveyor tube 34 and (see FIGURE 6) is integral with an interconnecting link 36 of an endless conveyor chain 38 which is enclosed within tube 34.

Rail assembly 21 is formed by a plurality of spaced transverse supporting brackets 23 which are supported by a frame construction (not shown). Each bracket 23 has a central slot 25 in which tube 34 is rigidly mounted, and at each side there is a slot 29 in which a nylon runner 31 is clamped, and a slot 33 in which a side plate 35 is clamped. Hence, each of the racks 22 is supported by the combined action of its bracket 28 and the two runners 31. The side plates 35 assist in guiding the products and providing protection from the side. Positioned over slot 32 is a cover 37 formed by a series of overlapping strips of sheet neoprene each of which has two rectangular openings 39 and 41 through which two adjacent brackets 30 extend.

Opening 39 is at the trailing end of the strip and fits somewhat closely on the bracket. Opening 41 is at the leading end of the strip and is elongated so that its bracket may move longitudinally of the strip. The strips overlap in "shingle style" with the leading end of each positioned over the trailing end of the next leading strip. As shown best in FIGURE 5, cover 37 is at an angle to the horizontal and it tends to deflect to the side product crumbs or other materials which drop onto it. Cover strips 37 are flexible and move with racks 22 and conveyor chain 38 with slot 32 thus covered. Tube 34 is closed except at its ends and at the zones where it is driven (see FIGURES 5, 6 and 9).

Conveyor chain 38 is formed by a series of interconnected units 40 and 46 which are similar to each other. Each unit 40 has a roller 42 with a horizontal shaft 44, and each unit 46 has a roller 48 with a vertical shaft 50. Each unit 46 also has a pair of identical links 52 and at each end of the unit the ends 54 of links 52 are connected by a pivot 56, to a connector 58. Each of units 40 is similarly constructed, with its links 36 (see FIGURE 6) which are identical with links 52. Each end of each pair of links 36 is also connected by a pivot pin 62 to the adjacent connector 58 so as to provide a universal pivot connection between each end of each of the units 40 and the next adjacent units 46. The central portions of links 52 are spaced relatively close together so as to provide side plates for the roller between them, while the ends of the links are spaced apart to provide an enlarged interconnecting pivot. Links 36 are similarly constructed.

Units 40 and 46 form an endless conveyor which moves within tube 34 and can follow and turn with the contour of the tube. Rollers 42 provide vertical support and rollers 48 provide horizontal guidance. Also, each of the racks 22 is rigidly mounted upon its unit 40 so that it is moved by the conveyor chain 38 and the conveyor chain provides support.

Figure 7:
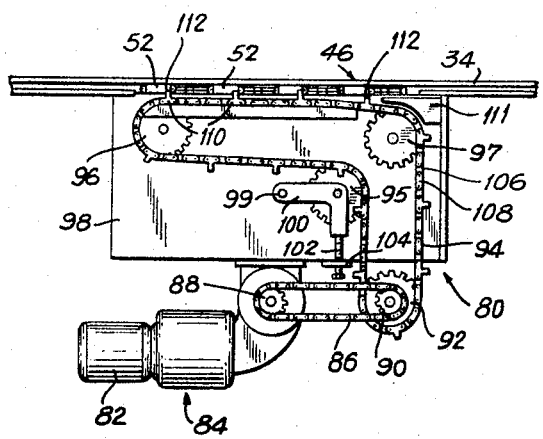
FIGURE 7 is a sectional view on the line 7—7 of FIGURE 6.

Referring now to FIGURE 7, each of the conveyor chain drive units 80 comprises: an electric motor 82; an adjustable speed gear reduction assembly 84; a driving chain 86 which extends between cog wheels 88 and 90; a cog wheel 92 which is fixed to cog wheel 90; a driving chain 94; and, three cog wheels 95, 96 and 97 which are mounted upon a mounting plate 98. Cog wheel 95 is swingably mounted upon a pivot 99 by a pair of brackets 100, and an adjusting screw bolt 102 is provided to adjust the tension on driving chain 94. That is, bolt 102 is threaded in a bracket 104, and when it is turned clockwise it swings brackets 100 and cog wheel 95 counterclockwise about pivot 99 so as to tighten the drive chain.

Drive chain 94 is formed by center links (see also FIGURE 7) 106, side links 108 and driving links 110. Each of the driving links 110 has a pair of spaced driving lugs 112 which are so spaced as to project directly above and below the center portions of the two links 52. As shown at the left in FIGURES 7 when one of the driving links 110 passes around cog wheel 96 it moves in behind the leading end of a pair of the links 52, and the driving lugs 112 ride in against the shoulders 114 formed by the spaced ends of the links. Hence, the driving movement is transmitted uniformly to the conveyor chain in an efficient and dependable manner.

Driving chain 94 has the driving links spaced so that a pair of lugs 112 engage the shoulders 114 of each of the units 46 of the conveyor chain. However, the pitch of the driving chain 94 is less than the pitch of the conveyor chain 38 so that the distance between each of the pairs of lugs 112 and the next is slightly less than the distance between adjacent pairs of shoulders 114 on the links 52. As represented in FIGURE 7, when a pair of driving lugs 112 is in driving relationship with the shoulders on the pair of links 52, there are three other pairs of driving lugs projecting along the next leading pairs of shoulders 114 on links 52. However, due to the slight lesser pitch of the adjacent driving lugs 112 relative to the spacing of link (shoulders 114), the right-hand pair of driving lugs 112 is not in driving relationship with its lugs, that is, the driving lugs 112 adjacent sprocket wheel 97 are no longer assisting in driving the conveyor chain. A wedge finger 111 is mounted upon the frame between sprocket wheel 97 and the conveyor chain. This wedge finger acts to wedge the driving links away from the conveyor chain whenever there is a tendency for a driving lug to stick. Therefore, when the driving link moves around sprocket wheel 97 the driving lugs are withdrawn easily from the conveyor chain without causing any undesirable effect.

As shown in FIGURE 5, one of the conveyor chain units carries a brush 136 which continuously sweeps the inside wall of tubes 34 and 122 so as to clean out any loose materials which fall into the tubes.

FIGURES 8 and 9 show the mounting arrangement at the ends of the spiral conveyor 18. The end of the spiral (shown in FIGURE 8 and at the top of FIGURE 9) is formed by two parallel straight sections 119 and a U-shaped end section 121. End section 121 is formed by: a U-shaped tube 122; a slightly larger tube 120 at each end of tube 122, and into which tube 122 is snugly telescoped, and also into which the end of the respective straight tube 34 is telescoped; U-shaped side plates 135 which overlap at their ends with the side plates 35; runners 131 which overlap at their ends with runners 31; three transverse brackets 123 which are similar to brackets 23, two of which are mounted at the ends of the U-shaped end section and the other of which is mounted at the center; transverse reinforcing strips 132; and a reinforcing bar 133. A rigid frame construction 130 supports the U-shaped end section 121, with the center transverse bracket 123 slidably resting upon the frame construction. This mounting permits the U-shaped end section 121 to slide longitudinally with respect to the straight sections 119.

Mounted at each end of the U-shaped section, there is an air cylinder and piston unit 138 which has its piston rod connected to a bracket 140 fixed to the slidable U-shaped end section and its cylinder 142 mounted upon a stationary bracket. These cylinders are supplied with air at a predetermined pressure so that the two assemblies urge the U-shaped end section away from the straight sections 119 with a predetermined effective force. A pressure-relief valve (not shown) insures that the air pressure will be uniform, and that the force exerted will be of the desired magnitude. Also, the pressure exerted by these cylinders may be changed as desired. With this arrangement, the conveyor chain is drawn longitudinally of the tubes 34, so that the conveyor chain has the required tautness. Hence, entire conveyor system will be conditioned for proper operation. Also, the plurality of drive units 80 tend to distribute the work load between them automatically. For example, when the conveyor is heavily loaded in one section and lightly loaded elsewhere, the drive units still operate in a dependable and efficient manner, and without overloading any one of them.

In FIGURE 9 the lower U-shaped end section 221 does not slide, but is supported by hanger strips 222 from the fixed frame above it. It is not necessary that all of the U-shaped end sections in the conveyor be slidably mounted, as the top section 121 is.

Proofers incorporating the present invention provide very precise control upon the proofing of the bread products. The attempts at obtaining a uniforming distribution of the air within the prior types of proofers has not produced completely uniform conditions for the various items. With such proofers, the positions of the products or items upon a tray or upon a rack may cause them to be maintained at different temperatures or humidity, one being satisfactory and the other not, or neither being satisfactory. The conveyor of the present invention permits maintaining uniform circulation of the air so that the position of an item transversely is not significant from that standpoint. Also, each item moves from the top level to the bottom level in the proofer, and also throughout the entire spiral path, so that all of the product items pass through the same zones. Hence, if the conditions in one zone vary from those in another, each item is still given the uniform treatment. With some prior proofers, the construction and operation were such that it is not possible to maintain the desired humidity conditions without causing condensation of moisture in some zones and resultant damage to the products. The present arrangement avoids that difficulty, the air may circulate freely, and there are no pockets where the air is cooled sufficiently to cause condensation. It has been pointed out that the present invention gives wide leeway in the conditions and time for various products. With prior proofers some attempts to obtain maximum production have resulted in an objectionably high percentage of inferior products. With the present invention, the optimum operating conditions for each type of product may be determined, and the operation can then be accurately carried on.

In a similar manner to the proofer, the oven provides uniform treatment to each of the items passing through it. The length of the portion of the conveyor within the proofer is such that when the conveyor is moving at the rate which provides the proper amount of time in the proofer, the dough will be in the oven for the correct amount of baking time as well. In a typical case, the dough requires sixty minutes of proofing and ten minutes of baking, so that the portion of the conveyor in the proofer must be six times as long as that in the oven. However, this ratio may be varied, so that the normal use of the invention is not limited to products with a fixed ratio between the proofing and baking times they require. Great flexibility is possible when required: it can be obtained either by providing means to feed raw dough onto the conveyor at other points in the proofer than at the beginning of the top level or by removing the baked goods from the oven before they reach the end of the top level. In this way, bakery equipment that is designed principally for products having a particular ratio of proofing to baking time can be adapted to produce products with a wide range of either greater or lesser ratios.

The use of a single conveyor system for both the proofer and the oven eliminates the need for additional equipment or hand labor to transfer proofed dough to the oven. Furthermore, it increases the efficiency of the proofer and the oven by providing each of them with an uninterrupted flow of dough items. The drive units 80 operate together and provide a synchronized drive system. Each of units 80 includes means to control its basic drive speed.

The term "proofer," as used herein, means a machine in which leavened dough is kept at a controlled temperature for raising, although the present invention also contemplates simultaneous, active control of the humidity. The term "proofing" is used as meaning the process of holding the leavened bread under proper conditions in a proofer.

What is claimed is:

1. In a system for proofing and baking bread products, the combination of, a proofer enclosure, an oven enclosure, an endless conveyor including a spiral conveyor portion within said proofer enclosure and a spiral conveyor portion within said oven enclosure, said endless conveyor being adapted to receive dough products and to carry them through said proofer enclosure and thence through said oven enclosure, means to maintain desirable temperature and humidity conditions within said proofer enclosure, heating means to maintain desirable temperature conditions within said oven enclosure, said spiral portions being of such length that the bread products are subjected to the desired ratio of proofing time to baking time, means to drive said conveyor at a rate to provide optimum proofer and baking times for the products, and means to remove said products from said conveyor for a part of one of said spiral conveyor portions thereby to change said ratio.

2. A system as described in claim 1 wherein said means to remove the products comprises means to divert the products from said conveyor and to deliver them to the spiral conveyor portion within said oven at a level beyond the level at which the products enter said oven enclosure.

3. A system as described in claim 1 wherein the first-named spiral conveyor portion spirals downwardly and the second-named spiral conveyor portion spirals upwardly.

4. In a system for proofing and baking bread products, the combination of a proofer enclosure an oven enclosure, an endless conveyor structure including a continuous monorail extending along a continuous path through said proofer enclosure and thence through said oven enclosure and thence along a return path past an unloading zone and a loading zone, said conveyor structure also including a plurality of product-supporting units which are individually mounted on said monorail and supported thereby and adapted to be moved around said continuous path whereby products placed upon one of said product-supporting units at said loading station are subjected to a proofing operation in said proofer enclosure and thereafter to a baking operation in said oven enclosure and may then be removed at said unloading zone, each of said product-supporting units comprising a supporting member which extends vertically from said monorail and tray-supporting rack means rigidly mounted upon said supporting member, each said tray supporting rack means comprising wire grid members bent in a zig-zag pattern with alternate extensions of the zig-zag grid of one tray-supporting rack means fitting between the extensions of the next adjacent tray-supporting rack means thereby to provide a continuous product supporting surface, said conveyor structure also including drive means positioned in spaced relationship along said continuous path and operative to impart movement to said product-supporting units.

References Cited

UNITED STATES PATENTS

| | | | |
|---|---|---|---|
| 1,073,126 | 9/1913 | Hitchcock | 107—57 |
| 1,335,915 | 4/1920 | Pointon | 107—57 |
| 1,716,460 | 6/1929 | Pointon | 107—57 |

WALTER A. SCHEEL, Primary Examiner

R. I. SMITH, Assistant Examiner

U.S. Cl. X.R.

107—4